US005716685A

United States Patent [19]
Kumar et al.

[11] Patent Number: 5,716,685
[45] Date of Patent: Feb. 10, 1998

[54] SILICONE-CONTAINING COPOLYMER AND BLEED THROUGH RESISTANT, INK RECEPTIVE, AND ADHESIVE RECEPTIVE COATINGS AND COATED SUBSTRATES PREPARED THEREFROM

[75] Inventors: Ramesh C. Kumar, Maplewood; Shari J. Cullen, Bloomington, both of Minn.

[73] Assignee: Minnesota Mining and Manufacturing Company, St. Paul, Minn.

[21] Appl. No.: 735,768

[22] Filed: Oct. 23, 1996

[51] Int. Cl.⁶ .................... B32B 7/12; B32B 7/06
[52] U.S. Cl. .............. 428/40.1; 428/352; 428/906; 428/354; 428/343; 526/264; 526/266; 526/279
[58] Field of Search ............... 428/40.1, 41.8, 428/352, 354, 906, 194, 343, 202; 526/264, 266, 279

[56]  References Cited

U.S. PATENT DOCUMENTS

| | | | |
|---|---|---|---|
| 2,532,011 | 11/1950 | Dahlquist | 154/53.5 |
| 3,022,988 | 2/1962 | Corson | 263/21 |
| 3,318,852 | 5/1967 | Dixon | 260/78.5 |
| 3,574,791 | 4/1971 | Sherman | 260/884 |
| 3,691,140 | 9/1972 | Silver | 260/78.5 |
| 3,944,527 | 3/1976 | McCown | 260/79.7 |
| 4,830,910 | 5/1989 | Larson | 428/336 |
| 4,873,140 | 10/1989 | McIntyre | 428/343 |
| 5,032,460 | 7/1991 | Kantner | 428/449 |
| 5,045,569 | 9/1991 | Delgado | 521/60 |
| 5,154,962 | 10/1992 | Mertens | 428/40 |

FOREIGN PATENT DOCUMENTS

WO 94/19420  9/1994  WIPO ................. C09J 7/02

*Primary Examiner*—Alexander Thomas
*Attorney, Agent, or Firm*—Janice L. Dowdall

[57]  ABSTRACT

The present invention provides a novel copolymer and coating prepared therefrom. The coating which is capable of being written on effectively with both solvent-based and water-based inks is also bleedthrough resistant. A repositionable pressure sensitive adhesive note is capable of effectively adhering to the coating. The invention also provides substrates coated with the coatings and articles such as pads formed from the coated substrates.

20 Claims, 5 Drawing Sheets

SILICONE-CONTAINING COPOLYMER AND BLEED THROUGH RESISTANT, INK RECEPTIVE, AND ADHESIVE RECEPTIVE COATINGS AND COATED SUBSTRATES PREPARED THEREFROM

FIELD OF THE INVENTION

The present invention provides a novel copolymer and coating prepared therefrom, wherein a coating of the copolymer is capable of being written on effectively with both solvent-based and water-based inks. The coating provides effective bleedthrough resistance when written on with both solvent-based and water-based inks. The coating of the invention is of such a nature that a repositionable pressure sensitive adhesive note can effectively adhere to it. The invention also provides substrates coated with novel coatings comprising the novel copolymers and novel articles such as pads and rolls formed from the coated substrates.

BACKGROUND OF THE INVENTION

A variety of coatings for paper have been developed to impart many different properties to the paper. These properties can include color, stiffness, receptivity to indicia, water resistance, bleedthrough resistance, release from pressure sensitive adhesives, etc.

Mertens, U.S. Pat. No. 5,154,962 describes a coating which comprises copolymers of (A) free radically polymerizable vinyl monomer, (B) polar monomer in a sufficient amount to impart a hydrated glass transtition temperature (Tg) of −15 degrees C to 35 degrees C and a difference of at least 20 degrees C between the hydrated and actual Tgs, and (C) siloxane-based polymer of a type and in an amount that will impart a satisfactory release value. The coating provides a substrate with a number of properties including the ability to be effectively written on with solvent and water-based inks, the indicia remaining firmly bonded and resistant to smearing. The coating also provides bleedthrough resistance to these inks. This coating, however, provides such good release properties that repositionable pressure sensitive adhesives do not adhere to it. For example, Post-it™ Notes, and Post-It™ Tape Flags, available from Minnesota Mining and Manufacturing Company ("3M") of St. Paul, Minn., which have a repositionable pressure sensitive adhesive thereon, either immediately or after a very short period of time, fall off of a vertically positioned substrate having the Mertens' coating thereon.

Thus there exists a need for a coating demonstrating ink receptivity and bleedthrough resistance, to which a repositionable pressure sensitive adhesive note can effectively adhere.

SUMMARY OF THE INVENTION

We have discovered a novel copolymer which is capable of forming such a coating. The present invention provides a novel random copolymer comprising the reaction product of:

(a) a monomer selected from the group consisting of methyl acrylate, ethyl acrylate, and mixtures thereof;

(b) a monomer selected from the group consisting of N-vinyl pyrrolidone, N-vinyl caprolactam, and mixtures thereof;

(c) a monomer selected from the group consisting of acrylic acid, methacrylic acid, itaconic acid, maleic acid, fumaric acid, 2-carboxymethyl acrylate, and mixtures thereof;

(d) a macromonomer having the general formula

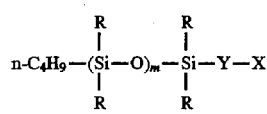

wherein
X is a vinyl group polymerizable with the monomers of elements (a), (b) and (c);
Y is a divalent linking group selected from the group consisting of $-CH_2-$, $-CH_2CH_2-$, and $-CH_2CH_2CH_2-$;
m is 20 to 2000;
each R is independently selected from the group consisting of hydrogen, $C_{1-8}$ alkyl, aryl, and alkoxy; and wherein a coating of the copolymer is capable of being written on effectively with both solvent-based and water-based inks;

wherein the coating is capable of providing effective bleedthrough resistance when written on with both solvent-based and water-based inks;

wherein a repositionable pressure sensitive adhesive note is capable of effectively adhering to the coating.

The present invention also provides an article comprising a substrate coated with a composition comprising the copolymer of the invention. Preferably, the substrate is paper.

One embodiment of the novel article comprises a substrate coated with a coating comprising the copolymer of the invention; wherein the coating comprising the copolymer is capable of being written on effectively with both solvent-based inks and water-based inks;

wherein the coating is capable of providing effective bleedthrough resistance when written on with both solvent-based inks and water-based inks; and wherein a repositionable pressure sensitive adhesive note is capable of effectively adhering to the coating.

Another embodiment of the article of the invention is a pad comprising a plurality of the novel articles attached together.

Another embodiment of the article of the invention is a roll comprising the novel article rolled upon itself.

The article of the invention may optionally further comprise one or more additional coating(s) selected from the group consisting of pressure sensitive adhesives, release coatings, primers, etc., wherein the additional coating(s) are coated on the substrate in area(s) other than where the coating comprising the copolymer is coated. One particularly preferred embodiment of the article of the invention is a pad comprising:

(a) a plurality of paper sheets, each sheet having a first side and a second side;

(b) a layer of pressure sensitive adhesive adjacent at least a portion of an edge of the first side of each sheet;

(c) a release coating layer positioned on the second side of each sheet in a position which is opposite that of the pressure sensitive adhesive layer which is on the first side of the sheet; and (d) a coating layer comprising the copolymer of the present invention on at least a portion of the second side of each sheet other than where the release coating layer is coated;

wherein the coating comprising the copolymer is capable of being written on effectively with both solvent-based inks and water-based inks;

wherein the coating is capable of providing effective bleedthrough resistance when written on with both solvent-based inks and water-based inks;

wherein a repositionable pressure sensitive adhesive note is capable of effectively adhering to the coating; and wherein the pad is assembled such that the sheets are stacked one upon another, such that the release coating layer of each sheet is positioned against the pressure sensitive adhesive layer of a sheet which is above it so that an uppermost sheet is removable.

Preferably, the paper sheets of the pad are rectangular sheets of the same dimension.

The pad may optionally further comprise a cardboard backing to which the plurality of sheets are attached.

Another preferred embodiment of an article of the invention is a roll comprising:

(a) a sheet of paper having a first side and a second side;

(b) a layer of a pressure sensitive adhesive adjacent at least a portion of a longitudinal edge of the first side of the sheet;

(c) a layer of a release coating positioned on the second side of the sheet, positioned such that it is opposite the layer of pressure sensitive adhesive on the first side of the sheet;

(d) a coating comprising the copolymer of the present invention on at least a portion of the second side of the sheet in area(s) where the release coating is not present;

wherein the coating comprising the copolymer is capable of being written on effectively with both solvent-based inks and water-based inks;

wherein the coating is capable of providing effective bleedthrough resistance when written on with both solvent-based inks and water-based inks;

wherein a repositionable pressure sensitive adhesive note is capable of effectively adhering to the coating;

wherein the sheet of paper is rolled upon itself in such a manner that the release layer is positioned directly against the pressure sensitive adhesive layer.

Another preferred embodiment of the article of the invention is a roll comprising:

(a) a sheet of paper having a first side and a second side;

(b) a first layer of a pressure sensitive adhesive adjacent at least a portion of a longitudinal edge of the first side of the sheet and a second layer of pressure sensitive adhesive adjacent at least a portion of another longitudinal edge of the first side of the sheet opposite the first layer of pressure sensitive adhesive;

(c) two layers of a release coating on the second side of the sheet, positioned such that one is positioned opposite each layer of pressure sensitive adhesive on the first side of the sheet; and (d) a coating comprising the copolymer of the present invention on at least a portion of the second side of the sheet in area(s) where the release coating layers are not present;

wherein the coating comprising the copolymer is capable of being written on effectively with both solvent-based inks and water-based inks;

wherein the coating comprising the copolymer is capable of providing effective bleedthrough resistance when written on with both solvent-based inks and water-based inks;

wherein a repositionable pressure sensitive adhesive note is capable of effectively adhering to the coating comprising the copolymer;

wherein the sheet of paper is rolled upon itself in such a manner that each release layer is positioned directly against the pressure sensitive adhesive layer which is directly on the opposite side of the sheet.

Preferably for each above describe roll, the sheet of paper from which the roll is formed is rectangular.

BRIEF DESCRIPTION OF THE DRAWINGS

FIG. 6a is a cross-sectional side view of the sheet material of FIG. 6 taken along line 6a—6a.

DETAILED DESCRIPTION OF THE INVENTION

Copolymer of the Invention

Alkyl Acrylate Monomers

Figure 1:
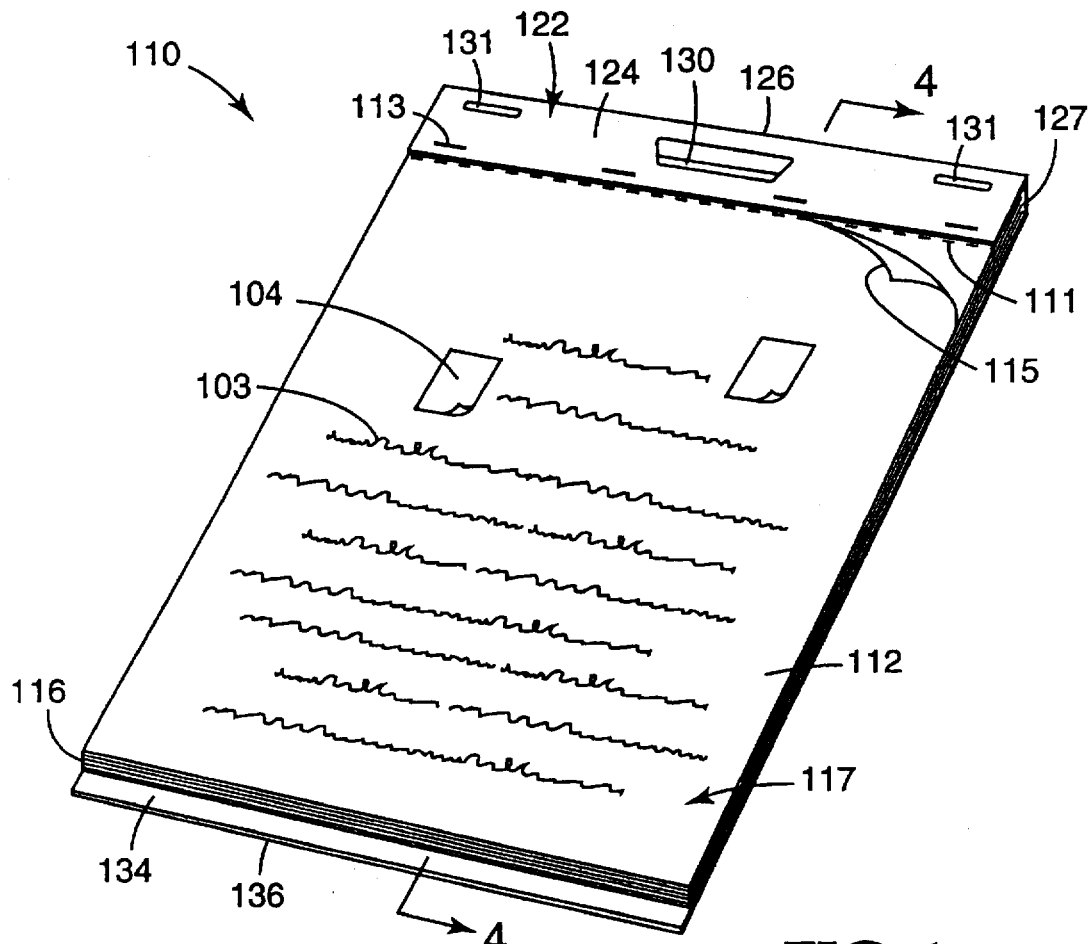
FIG. 1 is a perspective view of an embodiment of a pad of the present invention.

Useful alkyl acrylate monomers according to the present invention are those selected from the group consisting of methyl acrylate, ethyl acrylate, and mixtures thereof. These alkyl acrylate monomers are important in that they provide the copolymer with the following properties: bleedthrough resistance, film forming properties, and adhesive receptivity. If the monomers were not present in the copolymer the polymer would be brittle and would peel off a substrate after coating thereon. Higher molecular weight acrylate monomers such as propyl acrylate and butyl acrylate, for example, would not be useful in the copolymer of the present invention since they would lower the glass transition temperature of the polymer resulting in a tacky polymer which would not be useful for the intended coating applications.

Preferably the copolymer comprises about 30 to about 80 percent by weight, most preferably about 50 to about 55 percent by weight alkyl acrylate monomers based upon the total weight of the alkyl acrylate monomers, plus nitrogen-containing monomers, plus carboxylic acid functional monomers, plus silicone-containing macromonomers.

Nitrogen-Containing Monomers

The nitrogen-containing monomer selected from the group consisting of N-vinyl pyrrolidone, N-vinyl caprolactam, and mixtures thereof, help provide the copolymer of the invention with advantageous properties such as, for example, bleedthrough resistance and ink receptivity.

Preferably the copolymer comprises about 30 to about 50 percent by weight, most preferably about 40 to about 45 percent by weight nitrogen containing monomers based upon the total weight of the alkyl acrylate monomers, plus nitrogen-containing monomers, plus carboxylic acid functional monomers, plus silicone-containing monomers.

Carboxylic Acid Functional Monomers

It is required that the copolymer of the invention contain carboxylic acid functional monomer selected from the group consisting of acrylic acid, methacrylic acid, itaconic acid, maleic acid, fumaric acid, 2-carboxymethyl acrylate, and mixtures thereof. These monomers help provide the copolymer of the invention with advantageous properties such as, for example, ink receptivity, substrate adhesion, and coating integrity.

Preferably the copolymer comprises about 3 to about 10 percent by weight, most preferably about 4 to about 7 percent by weight carboxylic acid functional monomers based upon the total weight of the alkyl acrylate monomers, plus nitrogen-containing monomers, plus carboxylic acid functional monomers, plus silicone-containing macromonomers.

Silicone-Containing Macromonomers

The previously mentioned silicone-containing macromonomers are also included in the copolymers of the invention. The term "monomer(s)" as used herein also includes "macromonomers". These monomers help provide a coating made from the copolymer with "good hand" (a smooth feel to the coating). Preferably the formula of the silicone macromonomer is selected such that X is selected from the group consisting of:

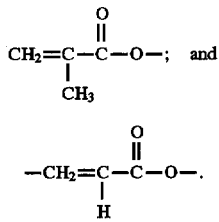

Preferably the macromonomer is represented by

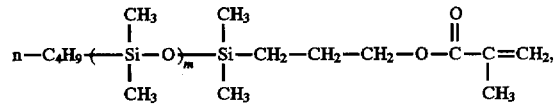

wherein m is 100 to 150.

Preferably the copolymer comprises about 0.5 to about 7 percent by weight, most preferably about 0.5 to about 2 percent by weight silicone-containing macromonomer based on the total weight of the alkyl acrylate monomers, plus nitrogen-containing monomers, plus carboxylic acid functional monomers, plus silicone-containing macromonomers.

Initiators

Free radical initiators are useful in forming the copolymers of the invention. Useful thermal free radical initiators include but are not limited to those selected from the group consisting of azo compounds such as 2,2'-azo-bis-(isobutyronitrile), dimethyl 2,2'-azo-bis-isobutyrate, azo-bis-(dipheynyl methane), 4-4'-azo-bis-(4-cyanopentanoic acid); peroxides such as benzoyl peroxide, cumyl peroxide, tert-butyl peroxide, cyclohexanone peroxide, glutaric acid peroxide, lauroyl peroxide, methyl ethyl ketone peroxide; hydrogen peroxide, hydroperoxides such as tert butyl hydroperoxide and cumene hydroperoxide; peracids such as peracetic acid and perbenzoic acid; potassium persulfate; and peresters such as diisopropyl percarbonate. Preferred initiators include those selected from the group consisting of 2,2'-azo-bis-(isobutyronitrile), 4-4'-azo-bis-(4-cyanopentanoic acid), and mixtures thereof.

Typically about 0.1 to about 0.6 percent by weight of initiator based upon the total weight of the monomers is used in forming the copolymers of the invention, preferably about 0.3 to about 0.5 percent based upon the total weight of the monomers.

Chain Transfer Agent

A chain transfer agent, it is believed, can optionally be used in forming the copolymer of the invention. Examples of suitable chain transfer agents it is believed include but are not limited to those selected from the group consisting of mercapto ethanol, octyl mercaptan, mercapto-propane diol, mercapto succinic acid, etc. Preferred chain transfer agents, it is believed would include those selected from the group consisting of octyl mercaptan, mercaptopropane diol, and mixtures thereof.

Typically about 0.01 to about 0.2 percent by weight of a chain transfer agent could be, it is believed, be included, preferably about 0.05 to about 0.1 percent by weight, based upon the total weight of the monomers.

Properties of the Copolymer of the Invention

The molecular weight of the copolymer of the invention can vary. Typically, the number average molecular weight of the copolymer of the invention ranges from about 15,000 to about 100,000, preferably about 20,000 to about 80,000, and most preferably about 25,000 to about 50,000 in order to optimize bleed through resistance and the smoothness of the coating.

The inherent viscosity of the copolymer of the invention can vary. Typically the inherent viscosity ranges from about 0.28 dl/g to about 0.48 dl/g measured in methanol in order to optimize bleed through resistance and the smoothness of the coating.

The glass transition temperature of the non-silicone portion of the polymer of the invention typically ranges from about 40 to about 90 degrees C, preferably about 50 to about 80 degrees C.

The amount of monomers and other components making up the copolymer can vary as long as the requisite claimed properties are present in a coating prepared therefrom. These include ink receptivity, bleedthrough resistance, and adherence of repositionable pressure sensitive adhesive notes.

The typical percentages are mentioned previously. If the amount of the alkyl acrylate is less than about 30 weight percent the coating tends to be uneven. If the amount of the alkyl acrylate is greater than about 60 weight percent the coating tends to be tacky resulting in poor ink adherence. If less than about 30 weight percent NVP is present the coating tends to streak and demonstrate poor adherence to inks. If greater than about 50 percent by weight NVP is present the coating prepared therefrom would be too hydrophilic to demonstrate bleedthrough resistance. If less than about 3 weight percent of the carboxylic acid functional monomer is present the coating tends to be tacky. If greater than about 10 weight percent of the carboxylic acid functional monomer is present the coating tends to be brittle and flaky. If the siloxane macromonomer is present in an amount greater than about 7 weight percent the coating would tend to demonstrate release properties, thus interfering with the ability of pressure sensitive adhesive repositionable notes to adhere thereto.

Method of Making the Copolymer of the Invention

The copolymer of the invention can be prepared by a number of different methods. Examples of such methods include but are not limited to those selected from the group consisting of free radical polymerization in solvent, emulsion polymerization, suspension polymerization, etc.

The following is an example of a typical free radical polymerization process in solvent. Into a closed reactor is charged the monomers, the initiator, optional chain transfer agent, if included, and an organic solvent such as methyl ethyl ketone, isopropyl alcohol, etc. The components can be charged in any order. The resulting mixture is purged to remove at least most of the oxygen. The mixture is heated to a temperature of typically about 50 to about 80 degrees C, preferably about 55 to about 65 degrees C, typically with agitation, for a period of time of about 12 to 24 hours to allow reaction to occur, preferably about 16 to about 24 hours until the total amount of any unreacted monomers is less than about 0.8 percent by weight based upon the total weight of the monomers plus solvent, most preferably about 0.3 to about 0.6 percent by weight based upon the total weight of the monomers plus solvent. This mixture is typically of very high Brookfield viscosity (typically above about 30,000 cps). To this mixture is added additional organic solvent in one or more charges with agitation as necessary in order to form a mixture having a percent solids content of about 12 to about 21, preferably about 18 to about 20 percent. The inherent viscosity of such a solution is typically about 0.28 to about 0.48 dl/g measured in methanol.

Coatings of the Copolymer of the Invention

Coatings comprising the copolymer of the invention can be coated on various substrates. These coatings are typically continuous. Examples of suitable substrates include, for example, films and nonwovens. Examples of suitable films include but are not limited to those selected from the group consisting of polyester, polypropylene, polyethylene, etc. Examples of suitable nonwovens include but are not limited to those selected from the group consisting of cellulosics such as paper, polypropylene, polyester, etc. Paper is a preferred substrate. Typically the coating comprising the copolymer is provided on a substrate by coating one of the aforementioned solutions on the substrate and allowing the solvent to dry off. Typically solutions are coated that have a percent solids content of about 10 to about 20, preferably about 12 to about 15. The dry coating weight on a substrate typically varies from about 3 to about 16 g/m$^2$, preferably about 5 to about 12 g/m$^2$.

In addition to comprising the copolymer of the invention it is theorized that the coatings of the invention can further comprise one or more of the following: dyes, defoaming agents, etc.

Articles of the Invention

As mentioned previously the present invention also provides an article comprising a substrate coated with a coating comprising the copolymer of the invention. Rolls and pads may be provided from the articles.

One preferred embodiment of the article of the invention comprises a sheet (such as a paper sheet, for example, having two sides). One side of the sheet has a layer of pressure sensitive adhesive on a portion thereof. The other side of the sheet has a layer of release coating on a portion thereof and a layer of a coating comprising the copolymer of the invention on another portion of the same side of the sheet as the release coating but on a portion of the sheet where the release coating is not present. The layer of pressure sensitive adhesive is typically continuous although it may be discontinuous. Examples of discontinuous coatings include dots, stripes, etc.

The layer of the release coating is coated on the side of the sheet directly opposite the pressure sensitive adhesive. The area of the release coating would typically be as large or larger than the area of the pressure sensitive adhesive on the opposite side of the sheet. The release coating layer would typically be continuous although it may be discontinuous as long as it provides acceptable release. One skilled in the art would be able to select a suitable release coating of suitable dimension and position such that it would provide appropriate release when positioned against the pressure sensitive adhesive on the same or another sheet.

On the same side of the sheet as the release coating, but in area(s) where the release coating is not present is a layer of a coating comprising the copolymer of the invention. The side of the sheet having the release coating and the coating of the copolymer of the invention typically does not have any uncoated areas. Typically, the release coating is positioned adjacent to one or two edges of the sheet and the rest of that side of the sheet is coated with the copolymer of the invention to maximize the area which can be written on and to which other repositionable pressure sensitive adhesive articles (such as notes, flags, etc.) can adhere. A release coating layer when positioned adjacent an edge may be positioned a distance from the edge (typically a small distance) or directly up against the edge.

As indicated previously one of the specific preferred embodiments of the article of the invention is a pad comprising a stack of paper sheets. Each sheet has two sides. One side of each sheet typically is uncoated except for a layer of a repositionable pressure sensitive adhesive adjacent one edge.

A preferred embodiment of the present invention provides a pad of the type including a multiplicity of aligned flexible sheets attached together along one edge portion to form a stack from which any of several uppermost individual sheets can either be pivoted away from an adjacent sheet, or can be separated from the stack and releasably adhered to a support surface by repositionable pressure sensitive adhesive on the sheet that can adhere well to many rough surfaces; which pads are particularly useful when made large in size and to include a stiff back card whereby they can be supported at the front of a room during a meeting in a generally vertical position and used to record lists of items or ideas generated during the meeting.

According to a preferred embodiment of the present invention there is provided a pad comprising a multiplicity of flexible sheets each having a band of repositionable pressure sensitive adhesive coated on its second (rear) surface adjacent to and spaced by a small predetermined spacing from a first edge and spaced by a large predetermined spacing from a second opposite edge. The sheets are disposed in a stack with the corresponding edges of the sheets aligned, the first (front) and second (rear) surfaces of adjacent sheets facing each other, and the band of repositionable pressure sensitive adhesive on each sheet adhering it to the adjacent sheet in the stack. On the front surfaces of the sheets, in separate areas are layers of the coating of the invention and also a layer of a release coating. The release coating at least covers the area which the pressure sensitive adhesive on the rear surface would contact when the sheets are in a stacked position.

Preferably, when used as a flip chart, the pad further includes a stiff back card to which the bottom most sheet in the stack is attached, which back card is at least coextensive with the sheets in the stack. That back card can have a top edge aligned with the first edges of the sheets, or, as illustrated herein, can have a top portion projecting past the aligned first edges of the sheets, which top portion has a peripheral support edge generally parallel to the first edges of the sheets over which support surface one or more of the sheets in the pad can be supported after they are peeled away from the adjacent underlying sheet. The top portion of the back card can have an elongate opening generally aligned with and spaced from that support edge with the part of the top portion between the opening and that support edge providing a handle by which the pad can easily be moved from place to place. To provide space for that opening the top portion of the back card should project in the range of about 5 to 10 centimeters (2 to 4 inches) past the first edges of the sheets. Also, the top portion of the back card can have two aligned parallel elongate through slots positioned adjacent opposite sides of the back card and adapted to receive the support pegs on some types of easels on which the pad might be supported.

Referring now to FIG. 1, there is shown a preferred embodiment of a pad of the present invention generally designated by the reference numeral 110, which pad 110 is in an embodiment sometimes called a "flip chart" or an "easel pad" which can be supported on a support such as an easel (not shown) at the front of the room during a meeting and used to record lists of items or ideas generated during the meeting.

Generally the pad 110 comprises a multiplicity of flexible sheets 112 (e.g., 30 sheets 112), each sheet 112 being generally of the same size, having first (front) and second (rear) surfaces having, upon removal from the pad 110, peripheral edges including first and second opposite edges 115 and 116, having a band 118 (see FIG. 2) of repositionable pressure sensitive adhesive coated on the second (rear) surface adjacent to and spaced by a small predetermined spacing 109 from the first edge 115 and spaced by a large predetermined spacing from the second edge 116, the sheets 112 being disposed in a stack 117 with the corresponding peripheral edges of the sheets 112 aligned, the first (front) and second (rear) surfaces of adjacent sheets 112 facing each other, and the band 118 of repositionable pressure sensitive adhesive on each sheet 112 adhering that sheet 112 to the adjacent sheet 112 in the stack 117. The first edge 115 is defined by the perforations 111 extending through each sheet 112. A band of release coating 107 is coated on the first (front) of each sheet 112 in the same position but on the opposite side of the sheet 112 as the band of repositionable pressure sensitive adhesive 118.

The coating of the invention 105 which is bleed through resistant, ink receptive, and pressure sensitive adhesive receptive is coated on the first (front) surface of each sheet 112 in the area between the release coating 107 and the edge 116 of each sheet 112. These terms are defined below. Writing 103 from solvent and/or water based markers is evident on the portion of the sheet 112 coated with the coating 105 of the present invention. (See FIG. 1) Repositionable pressure sensitive adhesive notes 104 are adhered to the front surface of a sheet 112 over an area coated with the coating 105 of the invention.

The sheets 112 can be, for example, of paper that weighs 15.4 pounds (7.0 kg) per ream 17 inch (432 mm) by 22 inch (559 mm) by 500 sheet in size, such as the paper commercially designated "Form Run Bond" that is available from Georgia Pacific, Kalamazoo, Mich., and may, for example, have a dimension between the first and second edges 115 and 116 of about 775 millimeters (30.5 inches) and a width in a direction parallel to the first and second edge 115 and 116 of about 635 millimeters (25 inches).

Referring to FIG. 1, the pad 110 further includes a back card 122 of a stiff material (e.g., rigid cardboard or chipboard 864 millimeters (34 inches) high by 635 millimeters (25 inches wide) having a from surface to which the second (rear) surface of the bottom most sheet 112 in the stack 117 is attached. The front surface of the back card 122 is coextensive with the sheets 112 in the stack 117, and the back card 122 has a top portion 124 projecting past the aligned top edges 127 of the sheets 112. The aligned top edges 127 are parallel to the first edges 115 and the second edges 116. The top portion 124 has a peripheral support edge 126 generally parallel to the first edges 115 of the sheets 112 preferably spaced about 9 centimeters (3.5 inches) from the first edges 115 of the sheets 112, over which support edge 126 one or more of the sheets 112 in the stack 117 can be supported after the bands 118 of pressure sensitive adhesive on those sheets 112 have been peeled away from the adjacent underlying sheet 112 and those sheets 112 are bent back over the support edge 126. The top portion 124 has an elongate through opening 130 generally aligned with and spaced from the support edge 126 with the part of the top portion 124 between the opening 130 and the support edge 126 providing a handle for the pad 110 by which the pad 110 can conveniently be manually moved around. Also, the top portion 124 has two aligned parallel elongate through slots 131 positioned adjacent opposite sides of the back card 122 and aligned parallel to the support edge 126, the slots 131 being adapted to receive the support pegs on some types of easels on which the pad 110 might be supported.

The back card 122 also has a bottom portion 134 projecting past the aligned second edges 116 of the sheets 112. The bottom portion 134 has a peripheral supported edge 136 generally parallel to the second edges 116 of the sheets 112 and spaced in the range of about 0.6 to 2.5 centimeters (0.25 to 1 inch) and preferably about 1.3 centimeters (0.5 inch) from the second edges 116 of the sheets 112, which supported edge 136 is adapted to be supported on a support surface such as on the support ledge of an easel while the bottom portion 134 spaces the second edges 116 of the sheets 112 sufficiently from that support surface to afford easy manual access to the sheets 112 as may be needed to use the pad 110. Staples 113 extend through the top portion 124 of the back card 122, the sheets 112 and the back of the back card 122.

Figure 2:
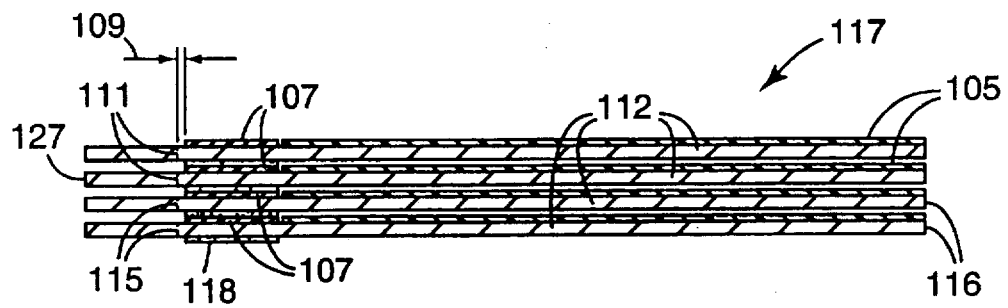
FIG. 2 is a partial side view of the pad of FIG. 1.

Referring to FIG. 2, preferably the band 118 of repositionable pressure sensitive adhesive that extends parallel to the first edge 115 is continuous, and has a width in a direction normal to the first edge 115 in the range of 3.75 to 6.25 centimeters (1.5 to 2.5 inches), with that band 118 preferably being about 5 centimeter (2 inches) wide. Alternatively, however, the band 118 of repositionable pressure sensitive adhesive could comprise a plurality of spaced areas coated with pressure sensitive adhesive that also has a width in a direction normal to the first edge 115 in that range.

The portion of the first (front) surface of each sheet 112 to which the band of adhesive 118 on the adjacent sheet is adhered to help retain the sheets 112 in the stack 117 is coated with a layer 107 of a suitable release material (see FIG. 2) to provide a desired releasable level of adhesion between the band of adhesive 118 and the adjacent sheet 112.

After writing 103 and/or positioning repositionable adhesive notes 104 on the front surface of the top sheet 112 in the pad, if he/she chooses to do so, a user of the pad 110 can peel the band of adhesive 118 on that top sheet 112 away from the second sheet 112 in the pad 110 by pulling on the top sheet 112 adjacent its second edge 116 in a direction generally at a right angle to the front surface of the underlying sheet 112. (See FIGS. 1 and 2) Tension in the top sheet 112 caused by such pulling will progressively peel the band 118 of adhesive from the underlying sheet 112, and the user will feel the top sheet 112 move much more easily away from the underlying sheet 112 as the last portion of the band 118 separates from the underlying sheet 112, thereby providing the user with a tactile signal that he should stop pulling on the sheet 112 if he does not wish to separate the top sheet 112 from the pad 110 via the perforations 111. If the user does not wish to remove the top sheet 112 from the pad 110, he can then stop pulling on the sheet and bend the top sheet 112 back over the support edge 126 on the top portion 124 of the back card 122, exposing the front surface of the underlying sheet. If the user wishes to remove the top sheet 112 from the pad 110 he/she can simply tear its first edge 115 away from the pad 110 via the perforations 111, whereupon the user may releasably adhere the removed sheet to a vertical support surface using the band 118 of pressure sensitive adhesive. After the uppermost sheet 112 is either bent back over the support edge 126 or removed, a user may similarly peel away each successive underlying sheet 112 and either also bend it back over the support edge 126 or remove it from the pad 110. Subsequently, if desired, the user can reposition any sheets 112 bent back over the support edge 126 in their original position on the pad and readhere them to the underlying sheet I 12 on the pad 110 using the bands 118 of adhesive. The bands 118 of adhesive will provide good adhesion to even rough vertical support surfaces, such as those of cloth or painted cement blocks, while affording clean removal of the sheets from all surfaces without leaving adhesive residue or damaging the surface such as by removing paint, paper, or fabric from the surfaces.

Figure 4:
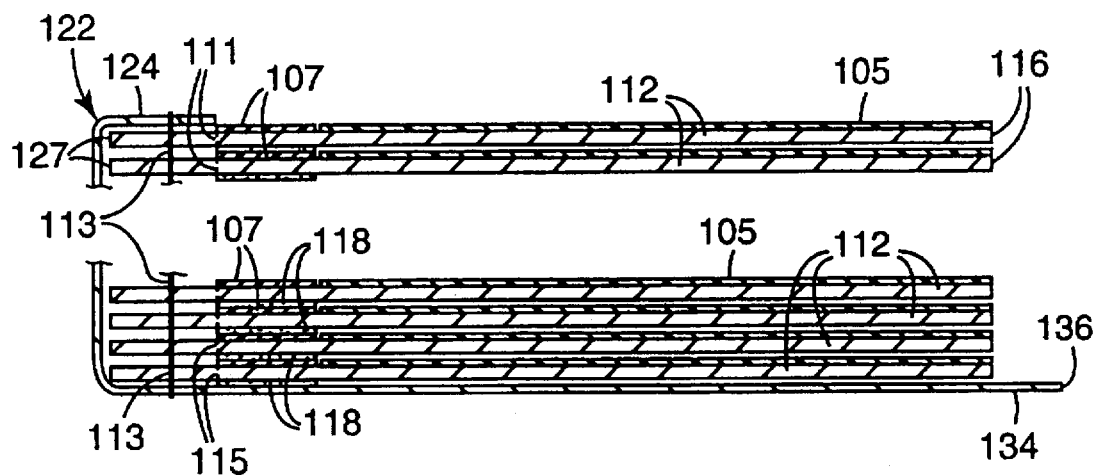
FIG. 4 is a cross-sectional side view taken along line 4—4 of FIG. 1 showing the means by which the sheets are attached together, wherein a number of centrally positioned sheets are not shown.

FIG. 4 is a cross-sectional side view of the pad of FIG. 1 wherein a number of the centrally positioned sheets are not shown.

Figure 3:
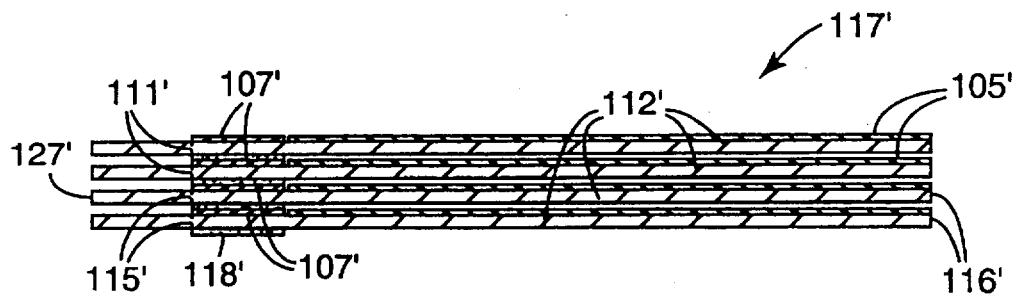
FIG. 3 is a partial side view of an alternative embodiment of a pad of the present invention.

Referring now to FIG. 3, there is shown a partial side view of an alternate embodiment of a pad of the present invention, which pad is also in an embodiment sometimes called a "flip chart" or an "easel pad" which can be supported on a support such as an easel (not shown) at the front of the room during a meeting and used to record lists of items or ideas generated during the meeting.

Generally the pad comprises a multiplicity of flexible sheets 112'; (e.g., 30 sheets 112'), each sheet 112' being generally of the same size, having first (front) and second (rear) surfaces having, upon removal from the pad, peripheral edges including first and second opposite edges 115' and 116', having a band 118' of repositionable pressure sensitive adhesive coated on the second (rear) surface adjacent to and spaced adjacent and directly up against first edge 115' and spaced by a large predetermined spacing from the second edge 116', the sheets 112' being disposed in a stack 117' with the corresponding peripheral edges of the sheets 112' aligned, the first (front) and second (rear) surfaces of adjacent sheets 112' facing each other, and the band 118' of repositionable pressure sensitive adhesive on each sheet 112' adhering that sheet 112' to the adjacent sheet 112' in the stack 117'. The first edge 115' is defined by the perforations 111' extending through each sheet 112'. A band of release coating 107' is coated on the first (front) of each sheet 112' in the same position but on the opposite side of the sheet 112' as the band of repositionable pressure sensitive adhesive 118'. The aligned top edges of the sheets 112' are identified as 127'.

The coating of the invention 105' which is bleed through resistant, ink receptive, and pressure sensitive adhesive receptive is coated on the first (front) surface of each sheet 112' in the area between the release coating 107' and the edge 116' of each sheet 112'. Writing from solvent and/or water based markers would be evident on the portion of the sheet 112' coated with the coating 105' of the present invention. Repositionable pressure sensitive adhesive notes would adhere to the front surface of a sheet 112' over an area coated with the coating 105' of the invention.

Figure 5:
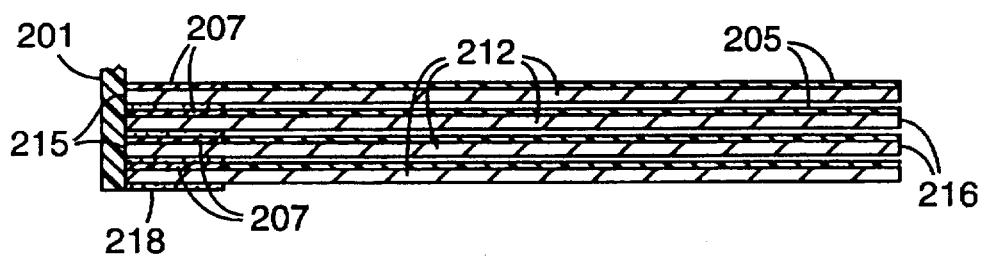
FIG. 5 is a side view of an alternative embodiment of a pad of the present invention.

Referring now to FIG. 5, there is shown a partial view of an alternate embodiment of a pad of the present invention.

Generally the pad comprises a multiplicity of flexible sheets 212; (e.g., 30 sheets 212), each sheet 212 being generally of the same size, having first (front) and second (rear) surfaces having, upon removal from the pad, peripheral edges including first and second opposite edges 215 and 216, having a band 218 of repositionable pressure sensitive adhesive coated on the second (rear) surface adjacent to and spaced adjacent and directly up against first edge 215 and spaced by a large predetermined spacing from the second edge 216, the sheets 212 being disposed in a stack 217 with the corresponding peripheral edges of the sheets 212 aligned, the first (front) and second (rear) surfaces of adjacent sheets 212 facing each other, and the band 218 of repositionable pressure sensitive adhesive on each sheet 212 adhering that sheet 212 to the adjacent sheet 212 in the stack 217. A band of release coating 207 is coated on the first (front) of each sheet 212 in the same position but on the opposite side of the sheet 212 as the band of repositionable pressure sensitive adhesive 218.

The coating of the invention 205 which is bleed through resistant, ink receptive, and pressure sensitive adhesive receptive is coated on the first (front) surface of each sheet 212 in the area between the release coating 207 and the edge 216 of each sheet 212. Writing from solvent and/or water based markers would be evident on a sheet 212 coated with the coating 205 of the present invention. Repositionable pressure sensitive adhesive notes would adhere to the front surface of a sheet 212 over an area coated with the coating 205 of the invention. A layer of padding compound 201 adheres the sheets 212 together via their edges 201. As each individual sheet 212 is removed some of the padding compound 201 is also removed.

A small amount of padding compound 201 is removed from the pad 110 upon removal of each sheet 212. The layer 201 of padding compound can be formed with any of several commercially available adhesive padding compound materials, such as "Merit" padding adhesive from Merrit Pad Co., Plainsville, Ohio; "Hurst Graphics" padding compound from Hurst Graphics, Los Angeles, Calif.; or "Champadco" padding cement from Champion Mfg. Co., Charlotte, N.C.

The pad of the present invention has now been described with reference to only several of many embodiments thereof. It will be apparent to those skilled in the art that many changes can be made in the embodiments described without departing from the scope of the present invention.

Rolls

As indicated previously the present invention also provides rolls coated with the coating of the invention. Various roll constructions can be coated with the coating of the invention. Various dispensing assemblies can be used with the rolls.

The present invention provides in another embodiment a roll of sheet material having the coating of the invention disposed thereon in a relatively compact easily portable dispensing assembly for dispensing lengths of sheet material (e.g., paper). The dispensing assembly that can be adapted to be mounted on an end portion of a backboard that may be supported on or included in a presentation easel or other support structure.

An embodiment of a dispensing assembly useful according to the present invention includes a cylindrical core having an axis; a length of sheet material helically wound into a roll coaxially around that core, the roll having axially spaced end surfaces and the core having opposite projecting end portions projecting axially past those end surfaces; and an enclosure. The enclosure includes a front portion comprising walls defining an elongate channel-like part of the front portion that is generally U-shaped in cross section, has opposite ends and has first and second elongate opposite edges extending between its ends, and end walls across the ends of the channel-like part with those end walls and the channel like part defining a chamber having an open side between the first and second elongate opposite edges of said channel-like part; and a rear portion including a rear wall having opposite ends, opposite first and second edges extending between its ends, and an attachment part adjacent its second edge including means adapted to be releasably mounted on support members on one end portion of a backboard. The front and rear portions include journal surface portions at each of their ends that are opposed in the closed position of the front and rear portions to define sockets at those ends that receive and journal the projecting end portions of the core with the roll in the chamber. The journal surface portions are separated when the front and rear portions are separated to afford removal of the projecting end portions of the core from between the journal surface portions. The first edges of the walls are spaced to define an elongate opening parallel to the axis through which lengths of sheet material from the roll can be pulled from said roll; and cutting means are provided on the first edge of the front portion along the opening for affording cutting a dispensed length of sheet material projecting through the opening from sheet material on the roll by pulling the dispensed length of sheet material into engagement with those cutting means.

Preferably, the front portion of the housing is vacuum formed of transparent polymeric material to afford visually inspecting the amount of sheet material remaining on the roll.

Also, preferably the rear portion is formed of polymeric material, the front portion includes a flange wall around the open side of the channel positioned face to face with said rear wall when the front and rear portions are in their closed position, and the means for removably mounting and releasably retaining the front portion on the rear portion in the closed position and for affording manual removal of the front portion from the rear portion comprises a plurality of projections from said flange frictionally received in sockets in the rear wall.

Referring now to FIGS. 6, 6a, and 7–11 there is illustrated an embodiment of a dispensing assembly that is generally designated by the reference numeral 10. The dispensing assembly 10 is adapted to be mounted on a backboard such as the backboard 12 illustrated in FIG. 6 that has opposite end portions and as illustrated is supported on a presentation easel 13, but which could as well be supported on another support structure such as a conference room presentation cabinet.

The dispensing assembly 10 includes a cylindrically tubular core 11 having an axis, and a length of sheet material 14 (e.g., paper) having front and rear surfaces 15 and 16 respectively, which length of sheet material 14 is helically wound into a roll 18 positioned coaxially around the core 11 with its front surface 15 outermost in the roll 18. The core 11 has projecting end portions 17 projecting axially past opposite end surfaces 19 of the roll 18. Two spaced strips 20 of repositionable pressure sensitive adhesive extend longitudinally along the rear surface of the length of sheet material 14, with each strip 20 being closely spaced from a different one of the longitudinal edges of the sheet material 14. Both the release layer strips 21 and the pressure sensitive adhesive strips 20 are positioned adjacent edges of the sheet material 14. However, the release layer strips 21 are positioned directly up against the edges whereas the pressure sensitive adhesive strips 20 are spaced a small distance from the edges. Two strips of release coating 21 are coated on the front surface of the sheet material 14 but directly opposite the strips of pressure sensitive adhesive 20 coated on the back of the street material 14. The coating 29 of the present invention is coated on the front surface of the sheet material 14 in the area not coated with release coating strips 21. Writing 3 from solvent and/or water based markers is evident on the sheet material 14 in FIG. 6. Repositionable pressure sensitive adhesive notes 5 adhere to the surface of the sheet material 14 coated with the coating 29 of the invention as seen in FIG. 6. The sheet material 14 can be of any suitable width with sheet material 14 at least 45 centimeters or 18 inches wide being useful for many purposes, and paper about 61 centimeters or 24 inches in width being most useful when intended for use on the backboard of conventional presentation easels.

Figure 6A:
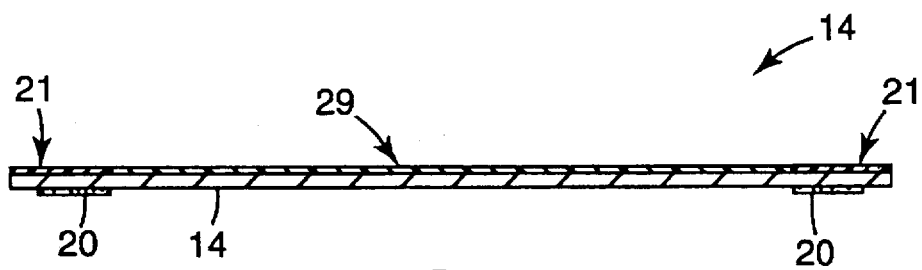
Figure 6B:
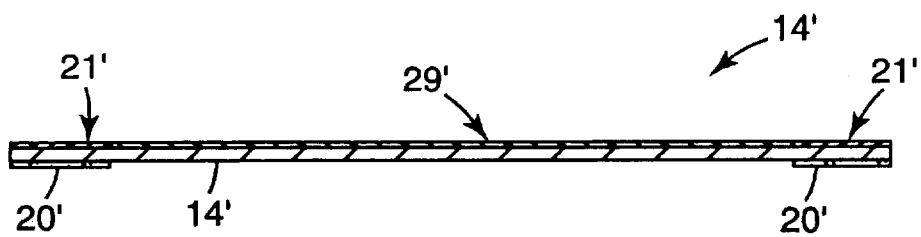
FIG. 6b is a cross-sectional side view of the sheet material of another embodiment of a roll of the invention.
Figure 6:
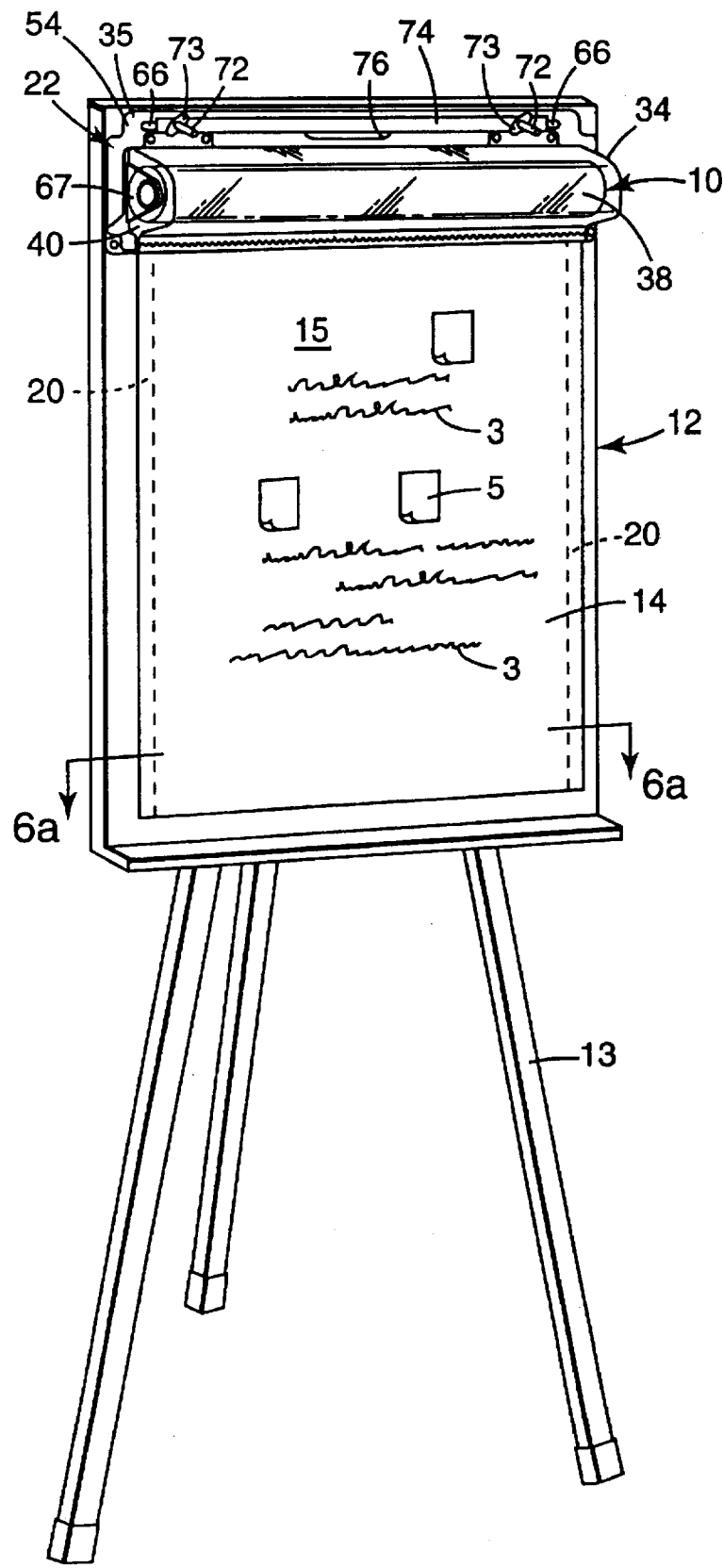
FIG. 6 is a perspective front view of a dispensing assembly including a roll of the present invention shown mounted on a backboard supported by a presentation easel.
Figure 7:
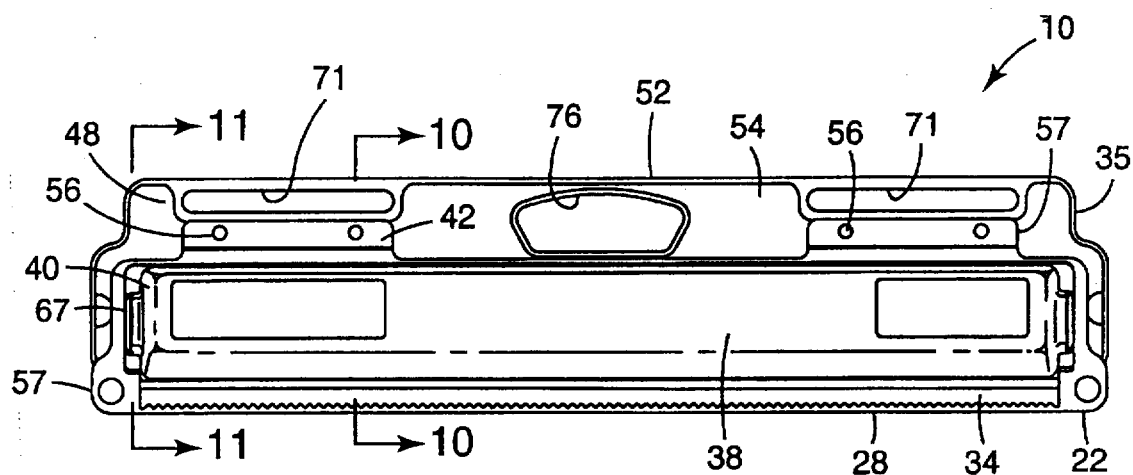
FIG. 7 is an enlarged perspective front view of the dispensing assembly of FIG. 6 removed from the backboard.

FIG. 6a is a cross-sectional side view of the sheet material 14 of FIG. 6 taken along line 6a—6a. The sheet material is identified as 14, the release coating is identified as 21, and the coating of the invention is identified as 29. In FIG. 6a the release layer strips 21 are wider than the pressure sensitive adhesive slips 20. When the sheet material 14 is in its rolled up position the strips are positioned such that pressure sensitive adhesive strips 20 are in contact with a release coated surface 21.

FIG. 6b is a cross-sectional side view of the sheet material 14' of an alternate embodiment of a roll of the invention. The sheet material is identified as 14', the release coating strips are identified as 21', and the coating of the invention is identified as 29'. In FIG. 6b the release layer strips 21' are as wide as the pressure sensitive adhesive strips 20' and the release strips 21' and pressure sensitive adhesive strips 20' extend all the way to the edge of the sheet material 14'. When the sheet material is in its rolled up position the strips are positioned such that pressure sensitive adhesive strips 20' are in contact with a release coated surface 21'.

Referring to FIGS. 6 and 7–9 the dispensing assembly 10 also includes an enclosure 22 having walls defining a chamber 24, and journaling means, later to be explained, mounting the core 11 supporting the roll 18 of sheet material 14 within the chamber 24 for rotation about its axis. Those walls define an elongate opening 26 parallel to the axis of the roll 18 and core 11 through which lengths of the sheet material 14 can be pulled from the roll 18. Cutting means 28 is provided on one of the walls along the opening 26 which affords cutting a dispensed length of the sheet material 14 projecting through the opening 26 from the sheet material 14 on the roll 18 by pulling the end of the dispensed length of sheet material 14 along the cutting means 28 sequentially into engagement with the cutting means 28. Also included in the dispensing assembly 10 are means on the enclosure 22 adapted to be releasably attached or mounted on one end portion of the backboard 12 (i.e., typically on the upper end portion as illustrated in FIG. 6) with the opening 26 adjacent the other end portion of the backboard 12.

The enclosure 22 includes front and rear portions 34 and 35 defining the chamber 24 in which the core 11 supporting the roll 18 of sheet material 14 is journalled. Those front and rear portions 34 and 35 are manually separable so that when the roll 18 of sheet material has all been dispensed, the portions 34 and 35 of enclosure 22 can be separated, the core 11 can be removed, and a new roll 18 of sheet material on a core 11 can be positioned in the chamber 24 of the again assembled enclosure 22. The front portion 34 of the enclosure 22 is vacuum formed of polymeric material (e.g., 0.060 inch thick sheet styrene) which preferably is transparent to afford visually inspecting the amount of sheet material 14 remaining on the roll 18. The front portion 34 comprises walls defining an elongate channel-like part 38 of the front portion 34 that is generally U-shaped in cross section, and end wails 40 across the ends of the channel-like part 38. The end walls 40 and the channel-like part 38 define a major part of the chamber 24 that has an open side, and the front portion 34 includes a co-planar flange 42 projecting outwardly from around the open side of the chamber 24. The flange 42 has an elongate edge which is defined by surfaces disposed at about a right angle with respect to each other to provide the cutting means 28 for the sheet material 14.

The rear portion 35 of the enclosure 22 is also vacuum formed of polymeric material (e.g., of 0.060 inch (1.52 mm)

thick sheet styrene). The rear portion 35 comprises a rectangular rear wall 48 having opposite ends, a first edge 50 extending between its opposite ends and defining one side of the opening 26 through which the sheet material 14 is dispensed, a rectangular recess 51 adjacent the front edge defining a minor portion of the chamber 24 in which a portion of the roll 18 is received, an opposite second edge 52, and an attachment portion 54 adjacent the second edge 52 including the means on the enclosure 22 adapted to be releasably attached on one end portion of the backboard 12.

Figure 11:
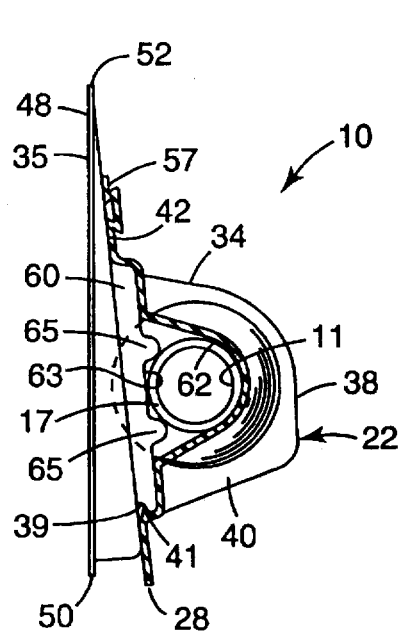
FIG. 11 is an enlarged sectional view taken approximately along lines 11—11 of FIG. 7 in which a rear portion of the dispensing assembly is not sectioned.
Figure 10:
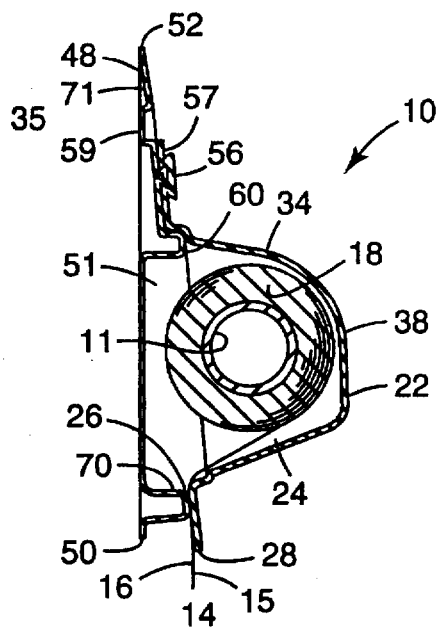
FIG. 10 is an enlarged sectional view taken approximately along lines 10—10 of FIG. 7.
Figure 9:
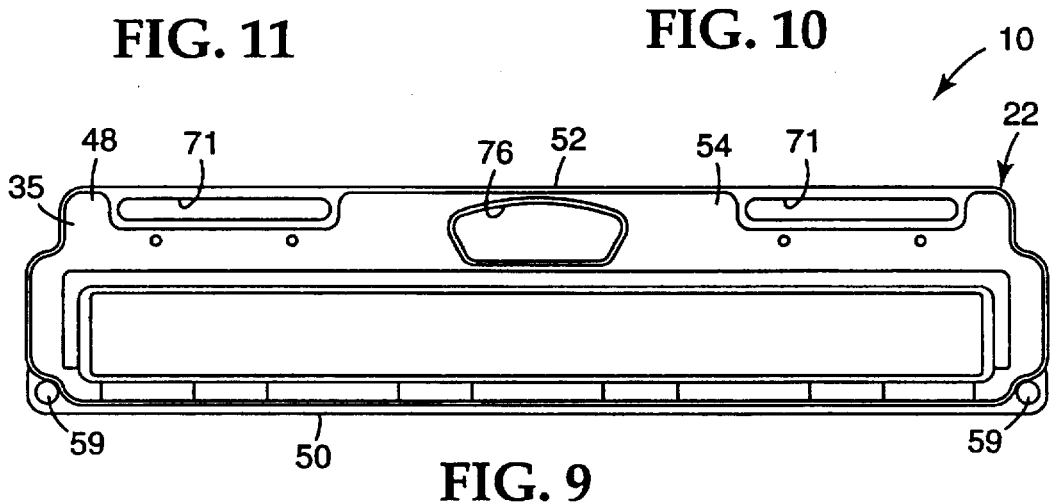
FIG. 9 is a rear view of the dispensing assembly of FIG. 6.
Figure 8:
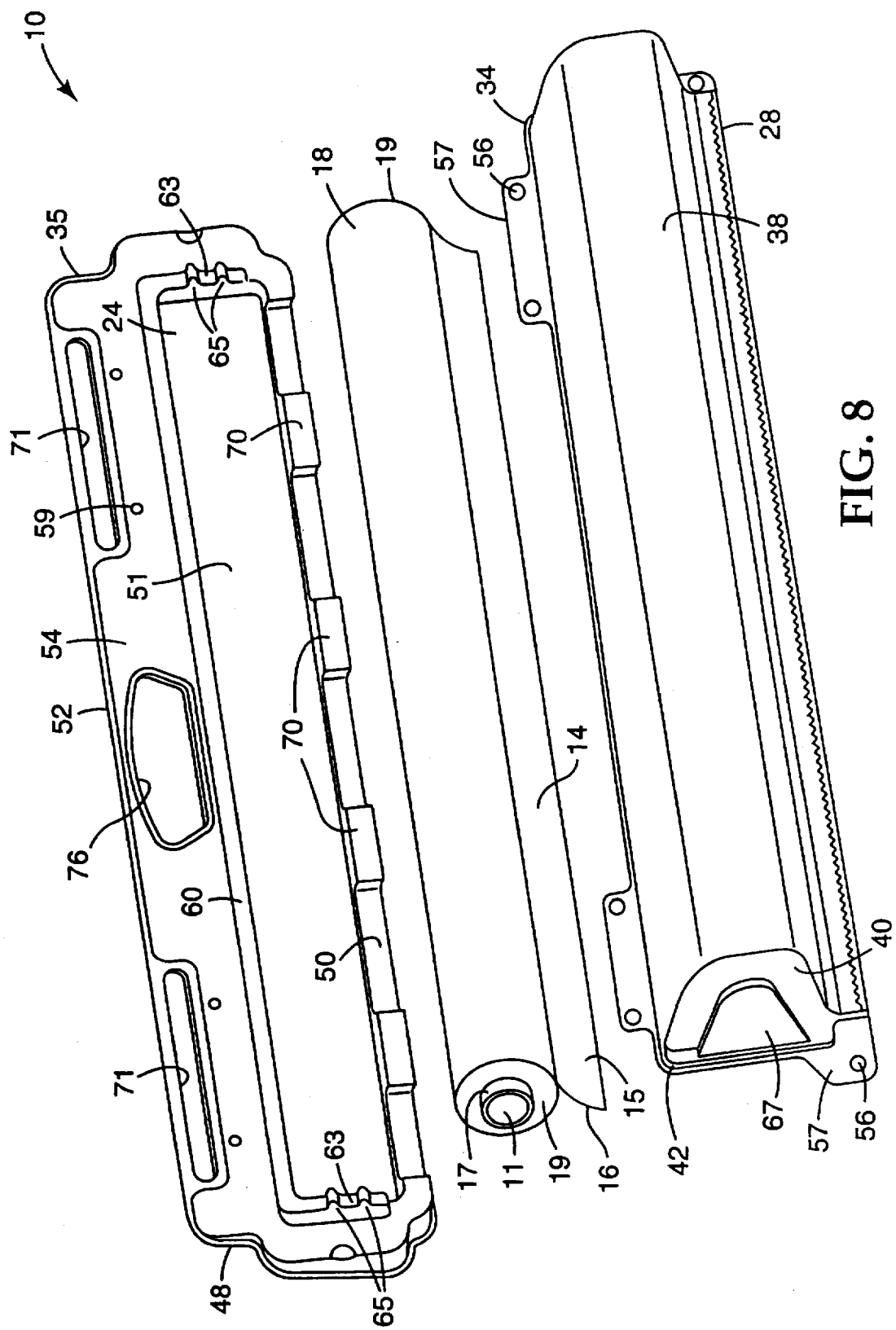
FIG. 8 is an exploded view of the dispensing assembly of FIG. 6.

Means for removably mounting and releasably retaining the front portion 34 on the rear portion 35 in a closed position while affording manual removal of the from portion 34 from the rear portion 35 at the sides and bottom are provided. A plurality of sockets 56 are present in tab-like portions 57 of the flange 42, which sockets 56 are adapted to receive mating projections 59 in the rear wall 48. Typically the interconnect between projections 59 and sockets 56 is so strong that using normal amount of force the assembly stays sealed at the top, only opening at the sides and bottom. Also, the rear wall 48 has an upwardly projecting rim 60 around three sides of the recess 52 (i.e., all sides but the side adjacent the opening 26). That rim 60 is adapted to fit closely within a mating recess around the front portion 34 where the flange 42 joins the channel like part 38 and the end walls 40 to help align the front and rear portions 34 and 35 when they are in their closed position. Referring to FIG. 11 projections 41 extending from front portion 34 can be frictionally and removably received in mating sockets 39 in rear portion 35.

The journalling means for the projecting end portions 17 of the core 11 are provided by opposed journal surface portions 62 and 63 (see FIG. 11) at each of the ends of the front and rear portions 34 and 35. Those journal surface portions 62 and 63 at each of the ends are opposed in the closed position of the front and rear portions 34 and 35 shown in FIGS. 6, 7, 10, and 11 to receive and journal the projecting end portions 17 of the core 11 when the core 11 is in the chamber 24; and those journal surface portions 62 and 63 are separated (See FIG. 8) when the front and rear portions 34 and 35 are separated to afford removal of the end portions 17 of the core 11 from between them.

The journal surface portions 63 on the rear portion 35 are partially defined by spaced projections 65 along the rim 60, whereas the journal surface portions 62 on the front portion 34 are defined by parts of arcuate inner surfaces on projecting parts 67 of the end walls 40 that also receive the spaced projections 65 when the from and rear portions 34 and 35 are in their closed position.

The first edge 50 of the rear portion 35 is partially defined by spaced recesses between projecting portions 70 of the rear wall 35, with those recesses providing finger access to the newly severed end of sheet material 14 in the opening 26 after a length of sheet material 14 has been dispensed from the dispensing assembly 10.

The attachment portion 54 of the rear wall 48 has two aligned elongate through slots 71 positioned adjacent opposite ends of the attachment portion 54 parallel to its second edge 52, which slots 71 are adapted to receive the support pegs or screws 72 on many conventional types of backboards such as the backboard 12 illustrated in FIG. 6 that can support the dispensing assembly 10. As is illustrated in FIG. 6 and is typical of a number of backboards, the support screws 72 threadably receive wing nuts 73 that can bear against a bar 74 that is placed over the attachment portion 54 and also receives the screws 72 in spaced openings so that the screws 72, bar 74 and wing nuts 73 clamp the attachment portion 54 to the end portion of the backboard 12.

Also, the attachment portion 54 of the rear wall 48 has a longitudinally centered elongate opening 76 generally parallel with and spaced from its second edge 52 with the part of the attachment portion 54 between the opening 76 and the second edge 52 providing a handle by which the dispensing assembly 10 can easily be moved from place to place.

It will be apparent to those skilled in the art that many changes can be made in the embodiments described without departing from the scope of the present invention. For example, the enclosure could be made with walls of polymeric material. The sheet material could comprise a polymeric film. The dispensing assembly would be useful for dispensing lengths of sheet material of the types described for use on surfaces other than the surfaces of backboards, such as on office or cubicle walls, and for that purpose, the slots 71 in the attachment portion 54 would not be needed. Also, the rear portion of the enclosure could be incorporated in or permanently attached to an end portion of a backboard.

Examples of suitable release coatings for any of the articles of the invention include but are not limited to those selected from the group consisting of release polymers which contain hydrophobic groups, such as long chain alkyl groups, organopolysiloxane groups, fluoroalkyl groups, fluoroalkylene groups such as poly(perfluoroalkyleneoxy) or combinations thereof which can be prepared by polymerizing a mixture comprising monomers which contain such groups. Such polymers and monomers include many that are well known. See, for example, the description of polysiloxane-containing monomers in U.S. Pat. Nos. 5,154,962 and 5,032,460; the description of long chain alkyl-containing monomers in U.S. Pat. No. 3,022,988; and the description of fluoroalkyl-containing monomers in U.S. Pat. Nos. 3,318,852; 4,830,910; 4,873,140; 3,944,527; and 3,574,791 (all of which are incorporated by reference herein). Another useful release material is described in U.S. Pat. No. 2,532,011, incorporated by reference herein.

One skilled in the art would be able to select a suitable pressure sensitive adhesive for use in the present invention. Preferably the pressure sensitive adhesive is a repositionable pressure sensitive adhesive. The pressure sensitive adhesive used should have sufficient strength to hang a coated substrate of the invention on a vertical surface. Examples of suitable pressure sensitive adhesives include but are not limited to those selected from the group consisting of acrylates, rubber resins, microsphere adhesives such as those described in WO 94/19420 (Sep. 1, 1994) and U.S. Pat. Nos. 3,691,140 and 5,045,569 (all incorporated by reference herein), patterned adhesives, hot melt adhesives, etc.

Various pressure sensitive adhesives can be used according to the present invention. The peel adhesion of the pressure sensitive adhesive can vary depending upon the intended application of the article of the invention. The peel adhesion of the pressure sensitive adhesive should be such that the surface to which it is to be adhered, such as a painted wall for example, will not be damaged by the adhesive upon removal. The adhesive should be suitable for adhering a substrate to a vertical surface, but removable without damage to the surface.

| ABBREVIATIONS | |
|---|---|
| The following abbreviations are used herein: | |
| MA | methyl acrylate |
| AA | acrylic acid |
| NVP | n-vinyl pyrrolidone |
| MEK | methyl ethyl ketone |
| SiMac | methacrylate functional polydimethyl siloxane |
| I.V. | inherent viscosity |
| NVC | N-vinylcaprolactam |
| EA | ethyl acrylate |
| MAA | methacrylic acid |
| Vazo 64 | 2,2'-azo-bis-(isobutyronitrile) available from DuPont |
| IPA | isopropyl alcohol |
| Rxn. | reaction |
| Tmp. | temperature |

-continued

ABBREVIATIONS
The following abbreviations are used herein:

| | |
|---|---|
| Comp. | Comparative |
| wt. % | weight percent |
| na | not available |
| Ex. | example |
| PSA | pressure sensitive adhesive |

EXAMPLES

The following examples further illustrate but do not limit the present invention. All parts, percentages, ratios, etc. in the Examples and elsewhere herein are by weight unless indicated otherwise.

Copolymer Synthesis

Example 1

In a 1 liter amber glass jar were charged 112.5 g MA, 87.5 g NVP, 12.5 g AA, 15 g SiMac, 397 g MEK, 25 g IPA and 1.1 g Vazo™64 initiator. The resulting homogeneous mixture was purged with nitrogen at I liter per minute for 5 minutes. The reaction mixture was then sealed in the glass jar and tumbled in a constant temperature bath at 55° C. for 16 hrs. A viscous milky copolymer solution was obtained having an inherent viscosity of 0.28 dl/g and a solids content of 35.6%. The copolymer solution was then diluted with 428 g of a 50/50 toluene/IPA mixture to achieve a final diluted solids content of 20%.

Comparative Example 1

The procedure of Example 1 was repeated. The charges were as follows: 86.3 g MA, 67.1 g NVP, 9.6 g AA, 57.5 g SiMac, 409 g MEK and 1.3 g Vazo™ 64. A viscous milky copolymer solution was obtained having an inherent viscosity of 0.33 dl/g and a solids content of 34.4%. The copolymer solution was then diluted with 473 g of a 50/50 toluene/IPA mixture to achieve a final diluted solids content of 20%.

Coatings

Coatings comprising the copolymer of the present invention may be used on a variety of substrates, typically paper. These coatings are unique in their possession of the following three characteristics, namely, bleedthrough resistance, ink receptivity and receptivity to repositionable pressure sensitive adhesives such as those found on repositionable notes. The novel coating of the present invention can be coated by any number of coating techniques known to those skilled in the art. An effective coating is one which provides a smooth continuous layer of copolymer on the substrate and exhibits bleedthrough resistance, ink receptivity and receptivity to repositionable pressure sensitive adhesives such as those found on repositionable PSA notes.

In order to evaluate bleedthrough resistance, ink receptivity and receptivity to pressure sensitive adhesives such as those found on repositionable notes, a coating was prepared as follows. Coatings were prepared of the copolymer solutions from Example 1 on a 15.4 pound (7 kg) bond paper roll stock available from Georgia Pacific Inc. The paper rolls were 12 inches in width. The copolymer solution of Example 1 was diluted to 12.5% solids and die coated onto one side of the paper base using a 12 inch (305 mm) wide modified rotogravure coater. The coating speed was set at 25 feet per minute (7.62 meters per minute).

The coated paper was then oven dried at 93° C. The final dried coating weight was 6.45 g/m². The coated paper substrate was then cut into single sheets for testing of bleedthrough resistance, ink receptivity, and receptivity to pressure sensitive adhesives such as those found on repositionable notes.

In a similar manner a comparative coating was prepared using the copolymer solution of Comparative Example 1. The coating weight of this comparative coating was 6.45 g/m².

Bleedthrough Resistance Test

The coating of the present invention is capable of providing effective bleedthrough resistance when written on with both solvent-based and water-based inks. The following test method was used to determine whether a coating had the property of bleedthrough resistance.

The coating of the present invention (Example 1) and that of Comparative Example 1 were tested for bleedthrough resistance. The resistance to bleedthrough of a solvent-based (Sanford™ Magnum™ 44 permanent black marker available from Sanford Corp., Bellwood, Ill. 60104) and a water-based (Sanford™ Mr. Sketch™ scented instant water color purple marker available from Sanford Corp., Bellwood, Ill. 60104) marker were tested on paper sheets coated with the coatings of the respective examples. The coated sheet was placed coated side up on top of another coated sheet. Each marker was then used to draw one horizontal line on the coated side of the top sample at moderate speed and very light pressure. A second horizontal line was then drawn on the coated side of the top sample at moderate speed applying a moderate amount of pressure. Finally, a third horizontal line was drawn on the coated side of the top sample at a slow speed while applying the maximum amount of pressure. Bleedthrough of the marker from the top sheet onto the bottom sheet was then evaluated and recorded as either none, slight, moderate or heavy for each coating and each marking pressure (light, medium and heavy). The results of these observations are shown in the Table 1 below. Coatings having effective bleedthrough resistance are defined herein as those coatings having a bleedthrough score of none.

The results in Table 1 indicate that coatings of the invention as well as Comparative Example 1 have excellent bleedthrough resistance.

In order to conduct this test, different solvent-based and/or water-based markers may be used in place of those listed above if they are unavailable.

TABLE 1

| | Bleedthrough Test | | |
|---|---|---|---|
| Example* | Light Pressure | Moderate Pressure | Heavy Pressure |
| Ex. 1 (s) | none | none | none |
| Ex. 1 (w) | none | none | none |
| Comp. Ex. 1(s) | none | none | none |
| Comp. Ex. 1(w) | none | none | none |

*Designation of (s) = solvent-based marker, (w) = water-based marker.

A coating formed from the copolymer of the invention is capable of being written on effectively with both solvent-based and water-based inks.

Writing Tests (Ink Receptivity)

The following test method was used to determine whether a coating could be effectively written on with both solvent-based and water-based inks.

The coating of the present invention (Example 1) and that of Comparative Example 1 were tested for their ability to be legibly written on by a variety of markers, both solvent and water-based. The markers selected for this test included:

A) Marks-A-Lot™ permanent orange marker (Avery Dennison, Dennison Division of Farmington, Mass.)
B) Sanford™ Expo™ dry erase black marker (Sanford Corporation, Bellwood, Ill.)
C) Sanford™ Sharpie™ fine point black permanent marker
D) Sanford™ Mr. Sketch™ washable blue marker E) Washable Crayola™ purple marker (Binney & Smith Inc. of Easton, Pa.)

F) Sanford™ Mr. Sketch™ scented instant water color purple marker

G) Sanford™ Flip Chart™ brown marker

The first three markers in this list (A–C) are solvent-based and the last four (D–G) are water-based.

The name of each marking pen was written with that particular pen on the coated side of a single paper sheet. The ink was then evaluated visually for spreading, feathering, streaking, beading, fading or any other undesirable quality. These observations were then recorded as noted in Table 2 as:

Excellent=good writing, no fading, beading or streaking

Very Good=slight beading, fading or streaking (abbreviated as V. Good)

Good=moderate beading, fading or streaking

Fair=heavy beading, fading or streaking

Poor=total beading or fading; unreadable

The coating is considered to be capable of being written on effectively with both solvent-based and water-based inks if at least one solvent-based marker and at least one water-based marker yield a good to excellent score.

If the above marker(s) are unavailable an alternate water-based and/or solvent-based marker may be utilized in order to conduct the test.

TABLE 2

| | Ink Receptivity | | | | | | |
|---|---|---|---|---|---|---|---|
| Example | Marker A | Marker B | Marker C | Marker D | Marker E | Marker F | Marker G |
| Ex. 1 | Excellent | Excellent | Excellent | V. Good | V. Good | Excellent | Excellent |
| Comp. Ex. 1 | Excellent | Excellent | Excellent | V. Good | Good | Excellent | Excellent |

Repositionable Pressure Sensitive Adhesive Note Adherence Test

A conventional repositionable pressure sensitive adhesive note is capable of effectively adhering to a coating comprising the copolymer of the invention. The following test method was used to determine the effectiveness of the repositionable pressure sensitive adhesive note in adhering to coatings falling within and outside the scope of the invention.

The coating of the present invention (Example 1) and that of Comparative Example 1 were tested for their receptivity to a repositionable pressure sensitive adhesive (PSA) such as that found on repositionable notes such as Post-it™ Notes and Post-it™ Tape Flags (available from 3M, St. Paul, Minn.). Coated samples were adhered, coated side up, to a 76.2 mm×114.3 mm aluminum panel using double sided adhesive tape. A 25.4 mm×76.2 mm (1 inch×3 inch) repositionable Post-it™ Note was removed from a note pad (Post-it™ Note Pad #671-3AN available from 3M, St. Paul, Minn.) and adhered to the coated surface by rolling a 2 kg roller one complete trip (back and forth once) across the Post-it™ Note and allowing the weight of the roller itself to adhere the note. Care was taken not to apply additional pressure to the roller. The Post-it™ Note was then peeled at 90 degrees from the coated substrate using a Sintech InsIron (Model Renew 1122 available from Sintech, Research Triangle Park, N.C.) with a crosshead speed of 305 mm/m and a full scale load of 400 g. The 90 degree peel values were recorded in g/25.4 mm width. The results of this peel test are shown in Table 4 below. "Effective adhesion" was defined as a 90 degree peel value between about 8 and about 95 grams/25.4 mm width.

The results in Table 3 indicate significant improvement to the receptivity to a repositionable pressure sensitive adhesives (PSA) such as that found on repositionable notes such as Post-it™ Notes (available from 3M, St. Paul, Minn.) on paper substrates coated with the copolymer of the present invention.

TABLE 3

| Repositionable PSA Adhesion | |
|---|---|
| Example | Adhesion (g/25.4 mmm) |
| Ex. 1 | 8.5 |
| Comp. Ex. 2 | 3.3 |

Various modifications and alterations of this invention will become apparent to those skilled in the art without departing from the scope and spirit of this invention, and it should be understood that this invention is not to be unduly limited to illustrative embodiments set forth herein.

We claim:

1. A random copolymer comprising the reaction product of:

(a) a monomer selected from the group consisting of methyl acrylate, ethyl acrylate, and mixtures thereof, (b) a monomer selected from the group consisting of N-vinyl pyrrolidone, N-vinyl caprolactam, and mixtures thereof;

(c) a monomer selected from the group consisting of acrylic acid, methacrylic acid, itaconic acid, maleic acid, fumaric acid, 2-carboxymethyl acrylate, and mixtures thereof;

(d) a macromonomer having the general formula

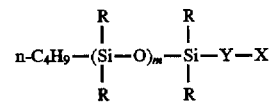

wherein

X is a vinyl group polymerizable with the monomers of elements (a), (b) and (c);

Y is a divalent linking group selected from the group consisting of —$CH_2$—, —$CH_2CH_2$—, and —$CH_2CH_2CH_2$—;

m is 20 to 2000;

each R is independently selected from the group consisting of hydrogen, $C_{1-8}$ alkyl, aryl, and alkoxy; and wherein a coating of the copolymer is capable of being written on effectively with both solvent-based and water-based inks;

wherein the coating is capable of providing effective bleedthrough resistance when written on with both solvent-based and water-based inks;

wherein a repositionable pressure sensitive adhesive note is capable of effectively adhering to the coating.

2. The random copolymer of claim 1 wherein X is selected from the group consisting of:

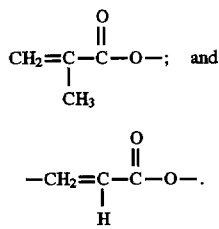

3. The random copolymer of claim 1 which comprises about 30 to about 80 weight percent of the monomer of element (a), about 30 to about 50 percent of the monomer of element (b), about 3 to about 10 percent by weight of the monomer of element (c), and about 0.5 to about 7 percent by weight of the monomer of element (d), based upon the total weight of (a) plus (b) plus (c) plus (d).

4. The random copolymer of claim 1 which comprises about 50 to about 55 weight percent of the monomer of element (a), about 40 to about 45 percent of the monomer of element (b), about 4 to about 7 percent by weight of the monomer of element (c), and about 1 to about 3 percent by weight of the monomer of element (d) based upon the total weight of (a) plus (b) plus (c) plus (d).

5. The copolymer of claim 1 wherein the monomer of element (a) is methyl acrylate, the monomer of element (b) is N-vinyl pyrrolidone, and the monomer of element (c) is acrylic acid, and wherein the macromonomer of element (d) is represented by

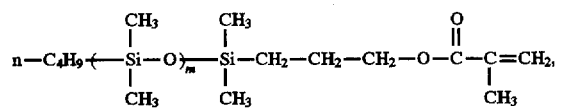

wherein m is 100 to 150.

6. The copolymer of claim 1 having a number average molecular weight of about 20,000 to about 100,000.

7. The copolymer of claim 1 having a number average molecular weight of about 25,000 to about 50,000.

8. An article comprising a substrate coated with a composition comprising the copolymer of claim 1.

9. The article of claim 8 wherein the substrate is paper.

10. The copolymer of claim 1 having a glass transition temperature ranging from about 40 to about 90 degrees C.

11. The copolymer of claim 1 having a glass transition temperature ranging from about 50 to about 80 degrees C.

12. An article comprising a substrate coated with a coating comprising the copolymer of claim 1;
wherein the coating comprising the copolymer is capable of being written on effectively with both solvent-based and water-based inks;
wherein the coating comprising the copolymer is capable of providing effective bleedthrough resistance when written on with both solvent-based and water-based inks; and
wherein a repositionable pressure sensitive adhesive note is capable of effectively adhering to the coating comprising the copolymer.

13. A pad comprising a plurality of the articles of claim 12 attached together.

14. A roll comprising the article of claim 12 rolled upon itself.

15. The article of claim 12 wherein the substrate is paper.

16. The article of claim 12 which further comprises one or more additional coating(s) selected from the group consisting of pressure sensitive adhesives and release coatings, wherein said additional coating(s) are coated on the substrate in area(s) other than where the coating comprising the copolymer is coated.

17. A pad comprising:
(a) a plurality of paper sheets, each sheet having a first side and a second side;
(b) a layer of pressure sensitive adhesive adjacent at least an edge of a margin of the first side of each sheet;
(c) a release coating layer positioned on the second side of each sheet in a position which is opposite that of the pressure sensitive adhesive layer which is on the first side of the sheet; and
(d) a coating layer comprising the copolymer of claim 1 on at least a portion of the second side of each sheet other than where the release coating layer is coated;
wherein the pad is assembled such that the sheets are stacked one upon another, such that the release coating layer of each sheet is positioned against the pressure sensitive adhesive layer of a sheet which is above it so that an uppermost sheet is removable.

18. The pad of claim 17 which further comprises a cardboard backing to which the plurality of sheets are attached.

19. A roll comprising:
(a) a sheet of paper having a first side and a second side;
(b) a layer of a pressure sensitive adhesive adjacent at least a longitudinal edge of the first side of the sheet;
(c) a layer of a release coating positioned on the second side of the sheet, positioned such that it is opposite the layer of pressure sensitive adhesive on the first side of the sheet;
(d) a coating comprising the copolymer of claim 1 on at least a portion of the second side of the sheet in area(s) where the release coating is not present; wherein the sheet of paper is rolled upon itself in such a manner that the release layer is positioned directly against the pressure sensitive adhesive layer.

20. A roll comprising:
(a) a sheet of paper having a first side and a second side;
(b) a first layer of a pressure sensitive adhesive adjacent at least a longitudinal edge of the first side of the sheet and a second layer of pressure sensitive adhesive adjacent at least a portion of another longitudinal edge of the first side of the sheet opposite the first layer of pressure sensitive adhesive;
(c) two layers of a release coating on the second side of the sheet, positioned such that one is positioned opposite each layer of pressure sensitive adhesive on the first side of the sheet; and
(d) a coating comprising the copolymer of claim 1 on at least a portion of the second side of the sheet in area(s) where the release coating layers are not present;
wherein the sheet of paper is rolled upon itself in such a manner that each release layer is positioned directly against the pressure sensitive adhesive layer which is directly on the opposite side of the sheet.

* * * * *